(12) United States Patent
Marshall (10) Patent No.: US 10,667,477 B2
(45) Date of Patent: Jun. 2, 2020

(54) TOP DRIPPING AND BOTTOM WICKING ASSEMBLY AND METHOD OF FEEDING A PLANT

(71) Applicant: 4D HOLDINGS, LLC, Valley Village, CA (US)

(72) Inventor: Aaron Marshall, Valley Village, CA (US)

( * ) Notice: Subject to any disclaimer, the term of this patent is extended or adjusted under 35 U.S.C. 154(b) by 310 days.

(21) Appl. No.: 15/592,994

(22) Filed: May 11, 2017

(65) Prior Publication Data
US 2018/0103598 A1   Apr. 19, 2018

Related U.S. Application Data (60) Provisional application No. 62/407,681, filed on Oct. 13, 2016.

(51) Int. Cl.
| | |
|---|---|
| A01G 27/04 | (2006.01) |
| A01G 27/06 | (2006.01) |
| A01G 9/02  | (2018.01) |
| A01G 25/02 | (2006.01) |
| A01G 9/04  | (2006.01) |
| A01G 27/02 | (2006.01) |
| A01G 13/02 | (2006.01) |
| A01G 22/00 | (2018.01) |
| A01G 9/12  | (2006.01) |
| A01G 31/02 | (2006.01) |
| A01G 24/18 | (2018.01) |

(52) U.S. Cl.
CPC .............. *A01G 27/04* (2013.01); *A01G 9/02* (2013.01); *A01G 9/042* (2013.01); *A01G 9/12* (2013.01); *A01G 13/0281* (2013.01); *A01G 22/00* (2018.02); *A01G 25/02* (2013.01); *A01G 27/02* (2013.01); *A01G 27/06* (2013.01); *A01G 31/02* (2013.01); *A01G 24/18* (2018.02)

(58) Field of Classification Search
CPC ............ A01G 13/0237; A01G 13/0281; A01G 27/02; A01G 27/04; A01G 27/06
USPC ........................... 47/32.7, 32.8, 66.7, 79, 81
See application file for complete search history.

(56) References Cited

U.S. PATENT DOCUMENTS 5,099,609 A * 3/1992 Yamauchi .............. A01G 27/04
                                                              47/79
5,430,972 A * 7/1995 Wianecki ................. A01G 9/02
                                                            47/66.6

(Continued)

*Primary Examiner* — David J Parsley (57) ABSTRACT

A top dripping and bottom wicking assembly and method of operation feeds a reservoir that controllably drips liquid nutrient solution from above a plant, and also uses capillary action of a planar wick member to draw the liquid nutrient solution into a plant growing medium and plant roots. The assembly works to controllably drip the liquid nutrient onto the plant through sized and dimensioned drip holes that form in the reservoir, while simultaneously dispersing the liquid nutrient solution through a planar wick member to disperse liquid nutrient solution to a plant growing medium and the roots of the plant. Stakes hold the reservoir above the plant. The wick member is flat and forms a central opening to allow passage of the plant. A plant support member retains the plant in an upright position. The plant support member forms wicking holes to enable passage of liquid nutrients from the wick.

19 Claims, 9 Drawing Sheets

(56) References Cited

U.S. PATENT DOCUMENTS

| | | | | |
|---|---|---|---|---|
| 6,418,663 B1 * | 7/2002 | Smith | .................. | A01G 27/006 47/48.5 |
| 7,958,670 B2 * | 6/2011 | Kamau | .................... | A01G 9/02 47/66.1 |
| 2006/0016126 A1 * | 1/2006 | Brorson | ................. | A01G 9/028 47/86 |

* cited by examiner

TOP DRIPPING AND BOTTOM WICKING ASSEMBLY AND METHOD OF FEEDING A PLANT

CROSS REFERENCE OF RELATED APPLICATIONS

This application claims the benefits of U.S. provisional application No. 62/407,681, filed Oct. 13, 2016 and entitled TOP DRIPPING AND BOTTOM WICKING ASSEMBLY AND SYSTEM, which provisional application is incorporated by reference herein in its entirety.

FIELD OF THE INVENTION

The present invention relates generally to a top dripping and bottom wicking assembly and method of feeding a plant. More so, the present invention relates to a top dripping and bottom wicking assembly provides a reservoir that controllably drips liquid nutrient solution from above a plant, and also uses capillary action of a planar wick member to draw the liquid nutrient solution into a plant growing medium and plant roots; whereby the assembly works to controllably drip the liquid nutrient onto the plant through sized and dimensioned drip holes that form in the reservoir, while simultaneously dispersing the liquid nutrient solution through a planar wick member to disperse liquid nutrient solution to a plant growing medium and the roots of the plant.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

It is known in the art that, non-self watering planters often require daily attention to check soil moisture and water as needed. If is also common for under and overwater to occur when the plants are not checked often enough of if too much water is given. Several self-water planters and devices exist, but most do not adequately regulate the amount of water that is given to a plant. Wick systems tend to allow the soil to remain very wet when the reservoir is full and dry when the liquid in the reservoir runs low. Several self-water planters operate based on a vacuum, but they tend to lead to overwatering. When the filling reservoir cap is removed to fill the reservoir, water runs uncontrollable into the soil. Also typically, they rely on soil saturation to stop the flow of water.

Typically, plants typically require feeding or watering or otherwise supplementing with liquid nutrition at least once weekly to survive. This may be accomplished by using a passive wicking system. A passive wicking system is a form of hydroponics that uses at least two or more wicks to transport nutrient solution or water from the reservoir into the growing medium and to the roots via capillary action such that plants are fed from the bottom up.

It is known that many self-watering, plant feeding assembly and systems incorporating wicking technology have been developed, but such assembly and systems are not specifically designed for simple, convenient, and economical use due to their complex construction, and are not easily adaptable to an existing plant reservoir or medium. It would thus be desirable to have an improved automated, top dripping and bottom wicking assembly and system for feeding or watering plants and the like, which avoids the disadvantages of the known assembly and systems.

Other proposals have involved hydroponic systems and irrigation of plants. The problem with these systems is that they do not provide a uniform distribution of liquid nutrients, and thy arte expensive to manufacture and operate. Even though the above cited irrigation systems meets some of the needs of the market, a top dripping and bottom wicking assembly provides a reservoir that controllably drips liquid nutrient solution from above a plant, and also uses capillary action of a planar wick member to draw the liquid nutrient solution into a plant growing medium and plant roots is still desired.

SUMMARY

Illustrative embodiments of the disclosure are generally directed to a top dripping and bottom wicking assembly and method of operation. The top dripping and bottom wicking assembly provides a reservoir that controllably drips liquid nutrient solution from above a plant, and also uses capillary action of a planar wick member to draw the liquid nutrient solution into a plant growing medium and plant roots, so as to maximize soil contact during wet and dry conditions and distribute liquid nutrient solution evenly throughout the plant roots.

In some embodiments, the top dripping and bottom wicking assembly and method of feeding a plant works to controllably drip the liquid nutrient solution onto a plant through sized and dimensioned drip holes that form in the reservoir, while simultaneously dispersing the liquid nutrient solution through a planar wick member to disperse liquid nutrient solution to a plant growing medium and the roots of the plant.

The assembly includes a geometrically shaped reservoir of variable size. The reservoir receives a liquid and nutrient for controlled dripping on the plant. The reservoir is defined by a generally ring-shape that allows a plant to pass through. The reservoir is also defined by a reservoir inner wall and a reservoir outer wall that form a channel. The bottom wall forms at least one drip hole that allows the contained liquid nutrient solution onto the plant.

A reservoir cap fits on the reservoir. A nozzle forms in the reservoir cap to receive the liquid nutrient solution for storage in the reservoir and drip distribution through the drip holes. The reservoir cap is defined by a generally ring-shape that allows a plant to pass through. The reservoir cap is also defined by a cap inner wall and a cap outer wall. The cap inner wall mates with the reservoir outer wall in a snap fit relationship that creates a seal for secure containment of the liquid and nutrient.

The assembly further comprises a plant support member that supports the plant and helps distribute the liquid nutrient solution evenly through the plant growth medium. The reservoir positions above the plant support member to drip liquid nutrient solution directly on top of the plant as it is supported on the plant support member. A plurality of stakes support the reservoir above the plant support member. In some embodiments, the plant support member is defined by a support surface that forms at least one bottom wicking hole for enabling passage of wicked water to the soil medium and roots of the plant. The plant support member is also defined by a brim that encircles the support surface, at least one segregating wall that segregates the support surface, and a central opening for enabling passage of the plant through the support surface.

The assembly further comprises a planar wick member that rests beneath the plant support member, and above a liquid nutrient solution. Thus, the planar wick member abuts coplanar to the support surface of the plant support member. The planar wick member is defined by a generally flat shape that wicks up liquid nutrient solution from a liquid source up to the plants using the process of capillary action. The liquid source from which the planar wick member draws the liquid nutrient may include a pot or other liquid storage container known in the art of hydroponics.

In one aspect, a top dripping and bottom wicking assembly, comprises:
- a reservoir defined by a generally ring-shape, the reservoir further being defined by a reservoir inner wall and a reservoir outer wall that form a channel, the walls being defined by at least one drip hole;
- a reservoir cap adapted to mate with the reservoir, the reservoir cap defined by a generally ring-shape, the reservoir cap further being defined by a cap inner wall and a cap outer wall,
- whereby the cap inner wall detachably couples to the reservoir outer wall;
- a nozzle integrated with the reservoir cap, the nozzle being in communication with the channel of the reservoir;
- a plant support member defined by a support surface, the support surface forming at least one bottom wicking hole, the plant support member further being defined by a brim that encircles the support surface, the brim forming a plurality of brim apertures, the plant support member further being defined by at least one segregating wall that segregates the support surface, the plant support member further being defined by a central support member opening;
- a plurality of conduits disposed on the support surface of the plant support member, the plurality of conduits in communication with the central support member opening and the plurality of brim apertures;
- a plurality of stakes extending between the reservoir and the plant support member, the plurality of stakes defined by a first end and a second end; and
- a planar wick member fabricated of flexible hydrophilic material for transmitting liquid by capillary action through the bottom wicking hole of the plant support member, the planar wick member disposed coplanar to the support surface of the plant support member, the planar wick member defined by a wick perimeter and a generally flat shape, the planar wick member further defined by a wick gap extending from the wick perimeter to a central wick opening.

In another aspect, the reservoir and the reservoir cap are geometrically shaped as a circle.

In another aspect, the reservoir and the reservoir cap are C-shaped and include an opening for receiving a plant and removing the reservoir from the plant.

In another aspect, the reservoir and the reservoir cap are molded from a single sheet of material.

In another aspect, the reservoir and the reservoir cap are fabricated from at least one of the following: plastic, rubber, metals, alloys, and combinations thereof.

In another aspect, the assembly is fabricated from biodegradable materials.

In another aspect, the reservoir and the reservoir cap couple together in a snap-fit relationship.

In another aspect, the reservoir and the reservoir cap couple together in at least one of the following: a snap-fit relationship, ultrasonic welding, and a bonding agent.

In another aspect, the assembly can be fabricated to scale any size or shape plant growing medium.

In another aspect, the assembly is configured to be disposable after one or more uses or reusable after several prior uses.

In another aspect, the nozzle comprises a plurality of barbs, whereby the barbs help secure a hose in place.

In another aspect, the nozzle comprises pierced barbed for piercing a larger hose, or double-sided barbed (T-shaped) for allowing liquid to be delivered to more than one assembly.

In another aspect, the stakes are of variable size extending from the bottom of the reservoir for providing stability to the assembly in a plant growing medium.

In another aspect, the plurality of stakes are defined by a first end and a second end.

In another aspect, the reservoir outer wall is defined by a plurality of L-shaped notches receiving the first end of the plurality of stakes.

In another aspect, the reservoir inner wall is defined by raised ridges, the raised ridges adapted to facilitate uniform distribution of liquid through the at least one drip hole.

In another aspect, the planar wick member is fabricated from at least one of the following: geotextile cloth, cloth, foam, sponge, non-woven materials, woven materials, open cell materials, closed cell materials, fibrous rope, propylene felt strips, tiki torch wicks, rayon rope, mop head strands, braided polyurethane yarn, wool felt, wool rope, nylon rope, and cotton rope.

In another aspect, the at least one wicking hole comprises wicking walls for concentrating exiting liquid through a pathway onto or into the plant support member and the planar wicking member.

In another aspect, the channel of the reservoir includes at least one pathway for transporting liquid to the at least one drip hole that forms at the walls of the reservoir.

In another aspect, the plant support member and the planar wick member include at least one of the following shapes: a circle, a rectangle, and a square.

In another aspect, the at least one segregating wall comprises eight segregating walls.

In another aspect, the at least one segregating wall is defined by a side wall at each side thereof extending from the central support member opening.

In another aspect, the at least one segregating wall is disposed on a top side of the side wall positioned adjacent to the central support member opening, such that at least one aperture is configured to receive the second end of the stake to provide stability of the assembly within the plant growing medium.

In another aspect, the support surface is disposed at a grade of at least 0.5% from the central support member opening to the brim of the plant support member.

In another aspect, the brim comprises a plurality of brim apertures.

In another aspect, the plant support member is fabricated from an opaque material for blocking light from penetrating, controlling air flow, and deterring pest infestation in the plant growing medium.

In another aspect, the plant support member is fabricated of a poly-vinyl material or a vacuum formed or thermoformed plastic material.

In another aspect, the plant support member is fabricated by injection molding.

In another aspect, the plant support member and planar wick member are bonded together with a bonding agent.

In another aspect, the plant support member is die-cut to allow the bottom of the reservoir to be positioned directly onto the planar wick member.

In another aspect, the planar wick member includes a plurality of notches configured to receive a plurality of geometrically shaped stakes of variable size extending therefrom the bottom of the reservoir.

One objective of the present invention is to combine controlled drip means with wicking means to feed a plant a liquid nutrient solution.

Another objective is to drip feed a plant from above to drip liquid nutrient solution directly on a plant, and wick liquid nutrient solutions from beneath the plant to feed the soil medium and roots of the plant.

Yet another objective is to provide for an even and thorough distribution of water or other liquid nutrition onto a plant.

Yet another objective is to prevent algae, mold, and weeds from growing in the plant growing medium by covering the medium in its entirety.

Yet another objective is to retain moisture within the plant growing medium.

Yet another objective is to promote water conservation.

Yet another objective is to provides a compact design for packing and shipping.

Another objective is to provide a wicking material, which must be hydrophilic and is preferably made of a synthetic plastic material such as polyester, can be cut as single pieces from a much larger piece of material.

Yet another objective is to manufacture a reservoir and a plant support member that is fabricated from a cutting die that can advantageously be used to cut multiple assemblies at the same time.

Yet another objective is to provide a barbed nozzle that receives a hose for filling the reservoir.

Yet another objective is to provide stakes to support the reservoir over the plant support member.

Yet another objective is to provide a plant support member that retains a plant upright within a central support member opening.

Yet another objective is to provide an inexpensive drip feed and wicking assembly.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

A top dripping and bottom wicking assembly 100 and method 300 for controllably feeding a plant is referenced in FIGS. 1-17.

Figure 1:
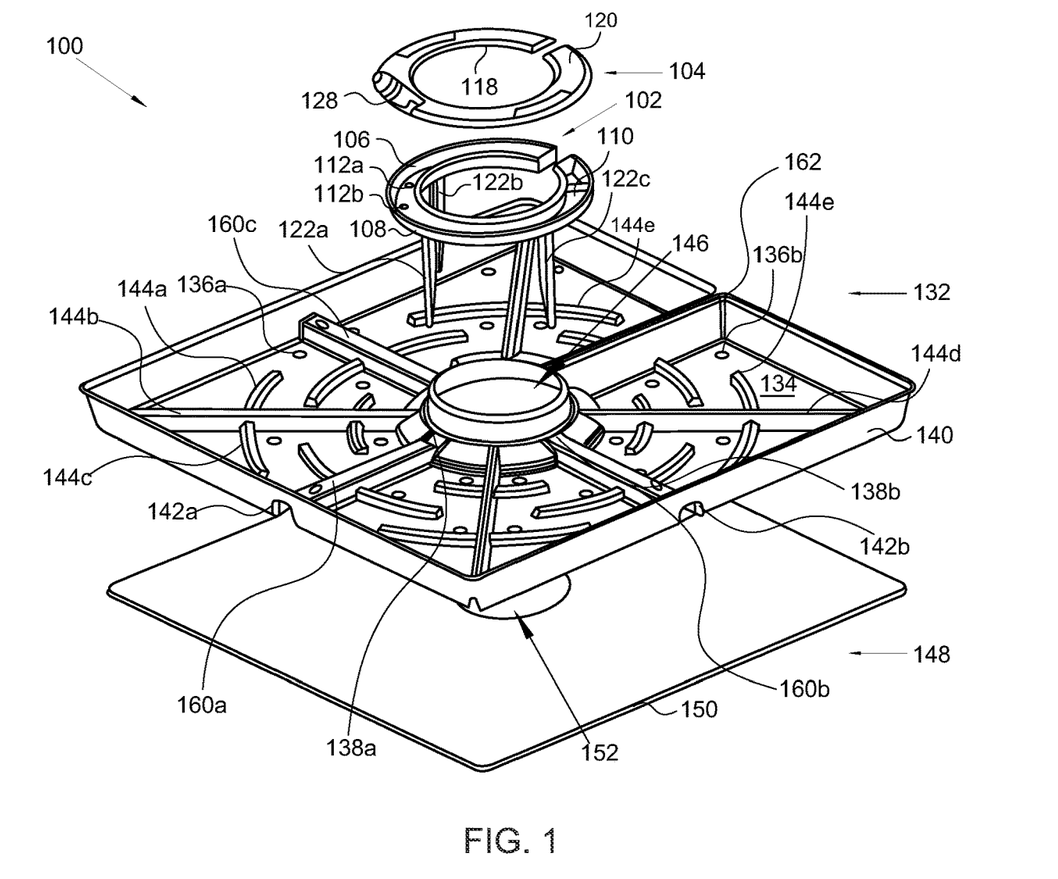
FIG. 1 illustrates a perspective view of an exemplary a top dripping and bottom wicking assembly, in accordance with an embodiment of the present invention.
Figure 2:
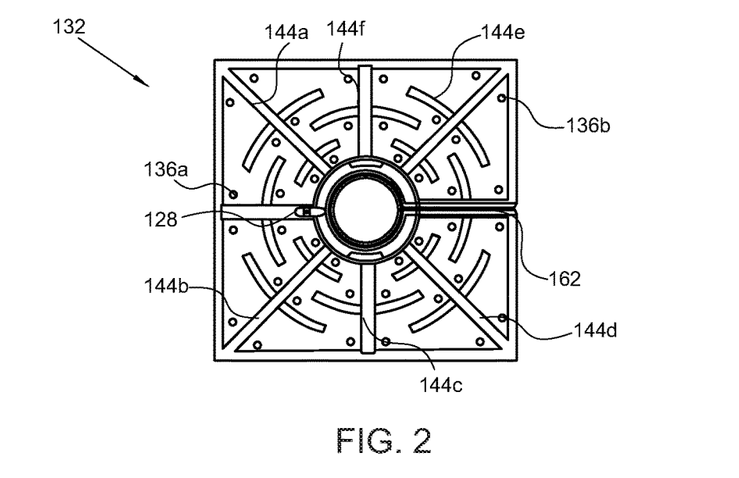
FIG. 2 illustrates a top view of an exemplary plant support member, in accordance with an embodiment of the present invention.

As illustrated in FIG. 1, the top dripping and bottom wicking assembly 100, hereafter "assembly 100" provides a reservoir 102 that controllably drips liquid nutrient solution from above a plant, and also uses capillary action of a planar wick member 148 to draw the liquid nutrient solution into a plant growing medium and plant roots, so as to maximize soil contact during wet and dry conditions and distribute liquid nutrient solution evenly throughout the plant roots. A plant support member 132, shown in FIG. 2, supports the plant in an upright position, contains a plant growth medium, and regulates excess liquid nutrient solution for even distribution through the plant growth medium and plant roots.

In one embodiment, the assembly 100 controllably dispenses liquid nutrient solution to a plant form above and below the plant for an even and thorough a unique hydroponic and irrigational distribution. Other unique advantageous of the assembly 100 may include, without limitation: inhibiting algae, mold, and weeds from growing in the plant growing medium by covering the medium in its entirety; deterring pest infestations; retaining moisture within the plant growing medium; promoting water conservation; reducing operational and manufacturing costs; and constructing a durable, compact design for packing and shipping.

The following terms and phrases shall have, for purposes of this application, the respective meanings set forth as follows: The terms "feeding" and "watering" are used interchangeably herein and are intended to have the same meaning with respect to the treating of a plant with liquid nutrition so that the plant may grow and flourish. The term "hydroponics" refers to the process of growing plants in sand, gravel, or liquid, with added nutrients, but without soil. The term "irrigation" refers to the application of water to soil or another medium by artificial means to foster plant growth. The terms "growing medium," "medium," or "media" refer to a liquid in which organic structures such as plants are placed to grow. Though, the assembly may be used with any suitable plant growing medium (e.g., Rockwool, soil, and the like) in a substrate growing system.

The term "liquid nutrient solution" refers to any form of liquid nutrition for a plant, including water and the like. The term "Rockwool" refers to the inorganic mineral based horticultural grade Rockwool primarily sold as a hydroponic substrate in the horticultural industry. The phrase "substrate growing system" is a hydroponic system in which the root zone is physically supported by media and the plants are fed by applying nutrient solution to the media.

Figure 3:
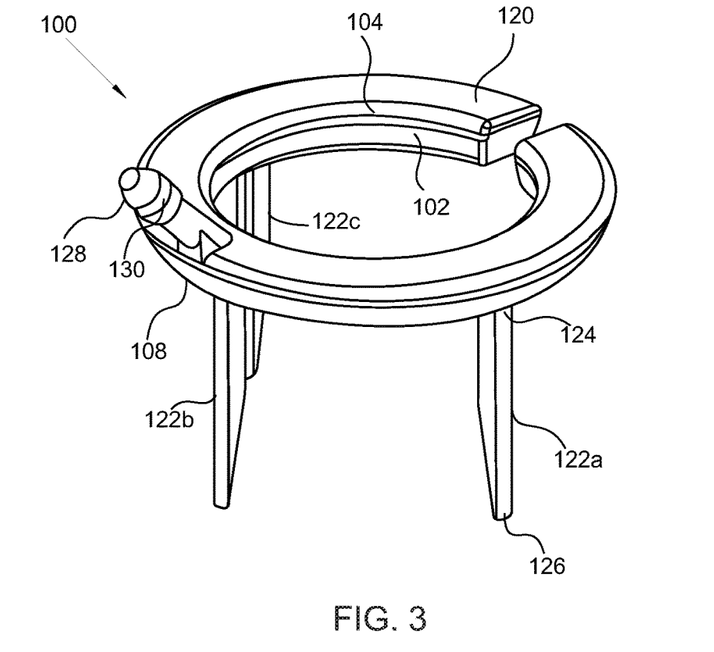
FIG. 3 illustrates a perspective view of an exemplary reservoir and reservoir cap supported on three stakes, in accordance with an embodiment of the present invention.
Figure 4:
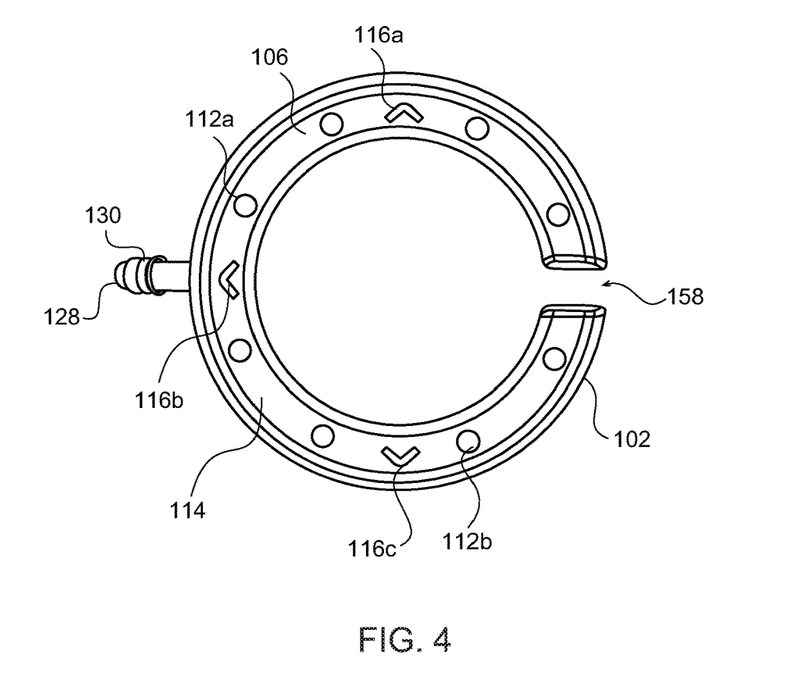
FIG. 4 illustrates a top view of a reservoir with the reservoir cap removed, in accordance with an embodiment of the present invention.

As referenced in FIG. 3, the assembly 100 comprises a reservoir 102 that stores and controllably drip a liquid nutrient solution onto the plant. The reservoir 102 stores the liquid nutrient solution for controlled dripping from above the plant. In some embodiments, the reservoir 102 may be defined by a generally ring-shape that forms a space for the plant to pass through. The reservoir 102 is also defined by a reservoir inner wall 106 and a reservoir outer wall 108 that form a channel 110. The outer wall 108 forms at least one drip hole 112a, 112b that allows the contained liquid nutrient solution to controllably drip onto the plant (FIG. 4).

As discussed above, the reservoir 102 forms a generally ring-shape. Though other shapes are possible. A reservoir gap 158 may form through the continuous reservoir 102 to enable passage of the plant. The reservoir 102 is also defined by a reservoir inner wall 106 and a reservoir outer wall 108 that form a channel 110. The channel 110 may include at least one pathway for transporting liquid nutrient solution through the drip hole 112a-b that forms at the inner and outer reservoir 102 walls.

The reservoir inner and outer walls 106, 108 are defined by at least one drip hole 112a-b. The at least one drip hole 112a-b is configured to enable the liquid nutrient to drip onto the plant beneath the reservoir 102. In some embodiments, multiple drip holes 112a-b may be positioned equidistant along the reservoir walls 106, 108. The reservoir inner wall 106 is defined by raised ridges 114. The raised ridges 114 are adapted to facilitate uniform distribution of liquid through the drip hole 112a, 112b.

In another embodiment, the reservoir outer wall 108 is defined by a plurality of L-shaped first notches 116a, 116b, 116c. The first notches 116a-c receive the first end 124 of the stakes 122a, 122b, 122c. In operation, the reservoir 102 is rotated to slide the L-shaped first end of the stakes 122a in and out of the first notches 116a-c.

In one embodiment, the reservoir 102 is molded from a single sheet of biodegradable material. In this manner, the reservoir 102 is disposable after one or more uses, or reusable after several prior uses. Suitable materials for the reservoir 102 may include, without limitation, plastic, rubber, metals, alloys, and any other suitable sturdy material capable of retaining liquids, e.g., water.

The assembly 100 further comprises a reservoir cap 104 that is adapted to mate with the reservoir 102. A nozzle 128 forms in the reservoir cap 104 to receive the liquid nutrient solution for storage in the reservoir 102 and drip distribution through the drip hole 112a-b. The reservoir cap 104 is defined by a generally ring-shape that allows a plant to pass through the center of the reservoir cap 104. The reservoir cap 104 is also defined by a cap inner wall 118 and a cap outer wall 120. The cap inner wall 118 mates with the reservoir outer wall 108 in a snap fit relationship that creates a seal for secure containment of the liquid and nutrient. However in other embodiments, the reservoir 102 and the reservoir cap 104 couple together in a snap-fit relationship, ultrasonic welding, or through use of a bonding agent.

In one embodiment, the reservoir cap 104 is molded from a single sheet of biodegradable material. In this manner, the reservoir cap 104 is disposable after one or more uses or reusable after several prior uses. Suitable materials for the reservoir cap 104 may include, without limitation, plastic, rubber, metals, alloys, and combinations thereof.

Looking again at FIG. 3, a nozzle 128 integrates with the reservoir cap 104. The nozzle 128 enables coupling to an external liquid nutrient solution or water source, and is in communication with the channel 110 that forms in the reservoir 102. In this manner, the liquid nutrient solution can be carried form an external hose, through the nozzle 128, and finally into the channel 110 can carry liquid nutrient solution for controllable dripping onto the plant.

In some embodiments, the nozzle 128 comprises a plurality of barbs 130. The barbs 130 help secure an external hose in place around the nozzle in a gripping relationship.

However in other embodiments, the nozzle 128 comprises pierced barbed for piercing a larger hose, or double-sided barbed, i.e, T-shaped, for allowing liquid to be delivered to more than one assembly. It should be understood that more than one nozzle 128 can be disposed on top of the reservoir cap 104 for receiving liquid from the hose. In operation, the assembly 100 can have one or more hoses connected to each individual plant thereby allowing the user to regulate the uptake of liquids for each plant.

Figure 5:
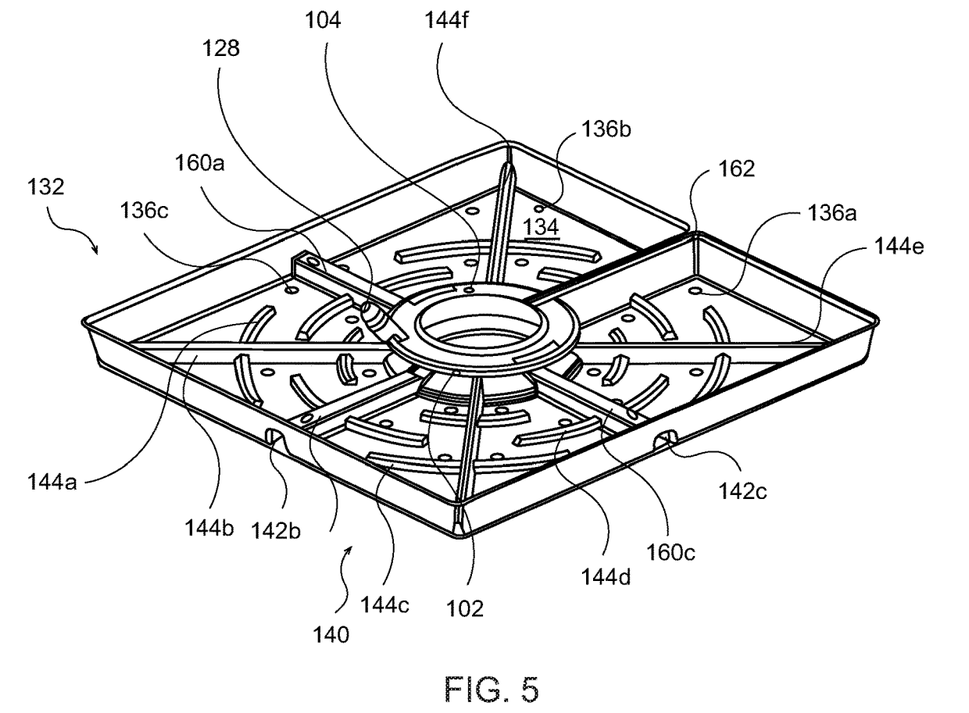
FIG. 5 illustrates a perspective view of a plant support member, in accordance with an embodiment of the present invention.
Figure 6:
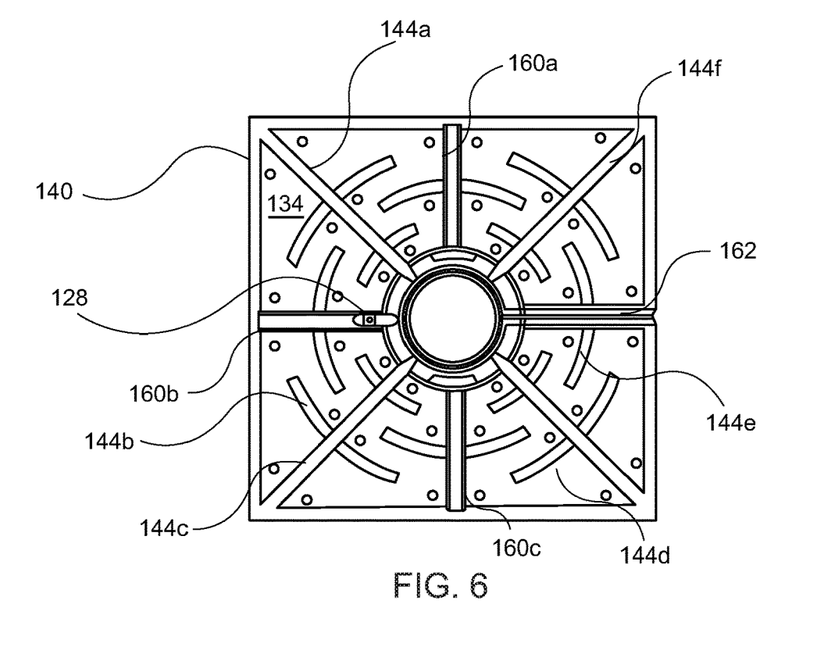
FIG. 6 illustrates a bottom view of a plant support member, in accordance with an embodiment of the present invention.

Turning now to FIG. 5, the assembly 100 further comprises a plant support member 132 that supports the plant and helps distribute the liquid nutrient solution evenly through the plant growth medium. The reservoir 102 positions above the plant support member 132 to drip liquid nutrient solution directly on top of the plant as it is supported on the plant support member 132. A plurality of stakes 122a, 122b, 122c support the reservoir 102 above the plant support member 132. Furthermore, as FIG. 6 illustrates, the reservoir outer wall 108 is defined by a plurality of L-shaped notches receiving the first end 124 of the stakes 122a-c.

Figure 7:
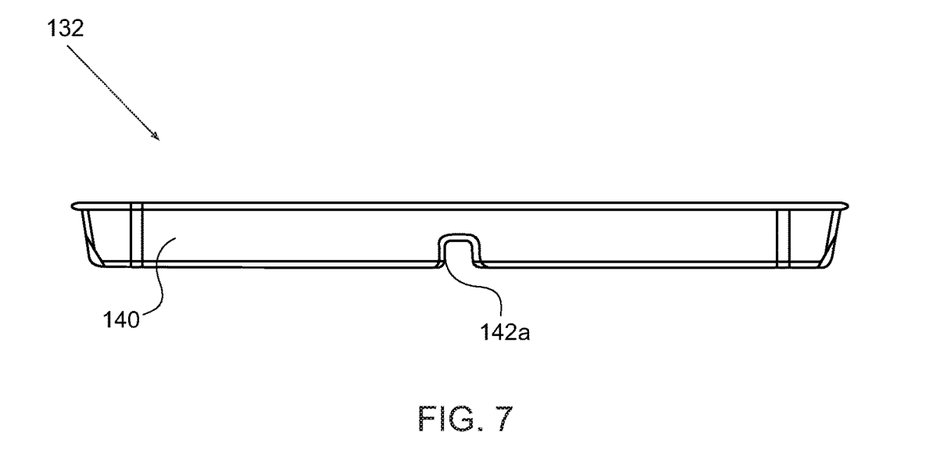
FIG. 7 illustrates an elevated side view of a plant support member, in accordance with an embodiment of the present invention.

As shown in FIG. 7, the plant support member 132 is defined by a support surface 134. In one embodiment, the support surface 134 is disposed at a grade of at least 0.5% from the central support member opening 146 to the brim 140 of the plant support member 132. The support surface 134 forms at least one bottom wicking hole 136a, 136b, 136c for enabling passage of wicked water to the soil medium and roots of the plant. Further, at least one aperture 138a, 138b, 138c forms in the support surface 134 to receive the second end 126 of the stakes 122a-c. This attachment point enables the stakes 122a-c to provide stability of the assembly 100 within the plant growing medium.

The plant support member 132 is also defined by a brim 140 that encircles the support surface 134. The brim 140 serves as a barrier to prevent excess liquid nutrient solution from spilling over the perimeter of the plant support member 132. In some embodiments, a plurality of brim apertures 142a, 142b form in the brim 140 to drain excess liquid nutrient solution.

The plant support member 132 is also defined by at least one segregating wall 144a-g that segregates the support surface 134 into sections. This segregation helps in control distribution of the liquid nutrient solution through the drip holes 112a-b. In one embodiment, the at least one segregating wall comprises eight segregating walls. In another embodiment, the segregating wall 144a-g is disposed on a top side of the side wall positioned adjacent to the central support member opening 146.

Figure 8:
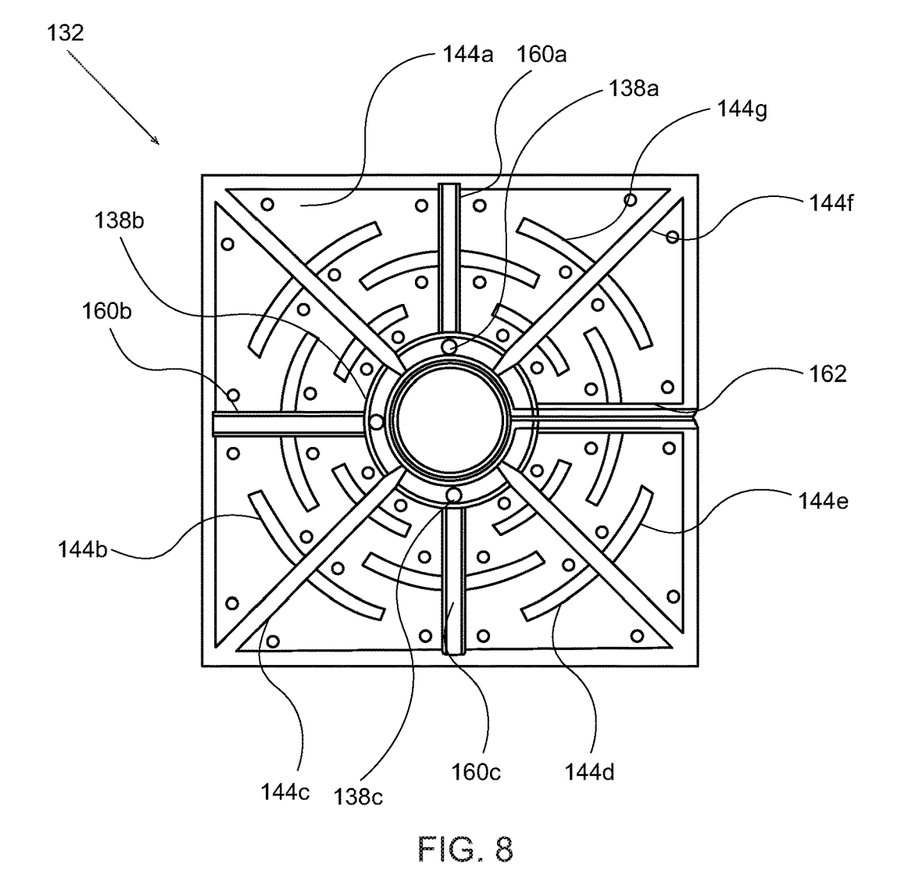
FIG. 8 illustrates a top view of a plant support member, in accordance with an embodiment of the present invention.

Looking now at FIG. 8, the plant support member 132 is also defined by a central support member opening 146 that enables passage of the plant to hold the plant in an upright position. The plant support member 132 is also defined by a support member gap 162 that enables passage of the plant from the brim 140 to the central support member opening 146.

In some embodiments, a plurality of conduits 160a, 160b, 160c traverse the plant support member 132 to carry excess liquid nutrient solution from the support surface 134 and the central support member opening 146 to the brim aperture 142a-b for discharge. This prevents excess moisture from damaging the plant roots. The plurality of conduits 160a-c may include three elongated, rectangular-shaped conduits disposed equidistant on the support surface 134.

The plant support member 132 can be fabricated to scale any size or shape plant growing medium. The plant support member 132 may have at least one of the following shapes: a square, a circle, a rectangle, and a rectangle. The plant support member 132 may be fabricated by injection molding. In one embodiment, the plant support member 132 is fabricated from an opaque material for blocking light from penetrating, controlling air flow, and deterring pest infestation in the plant growing medium. In another embodiment, the plant support member 132 is fabricated of a poly-vinyl material or a vacuum formed or thermoformed plastic material.

In yet another embodiment, the plant support member 132 is die-cut to allow the bottom of the reservoir 102 to be positioned directly onto a planar wick member 148, discussed below. In this manner, the plant support member 132 abuts coplanar to the planar wick member 148 only from the outside diameter of the reservoir 102 to the outer wall perimeter of the plant support member 132.

Looking again at FIG. 3, a plurality of stakes 122a, 122b, 122c extend between the reservoir 102 and the plant support member 132. The stakes 122a, 122b, 122c are of variable size extending from the bottom of the reservoir 102 for providing stability to the assembly 100 in a plant growing medium. In one embodiment, the stakes 122a-c are defined by a first end 124 that tapers down to a narrower second end 126. The stakes 122a-c help stabilize the reservoir 102 on the plant growth medium. In one embodiment, three stakes are used. Suitable materials for the stakes 122a-c may include, without limitation, bamboo, wood, plastic, aluminum, and combinations thereof.

Figure 9:
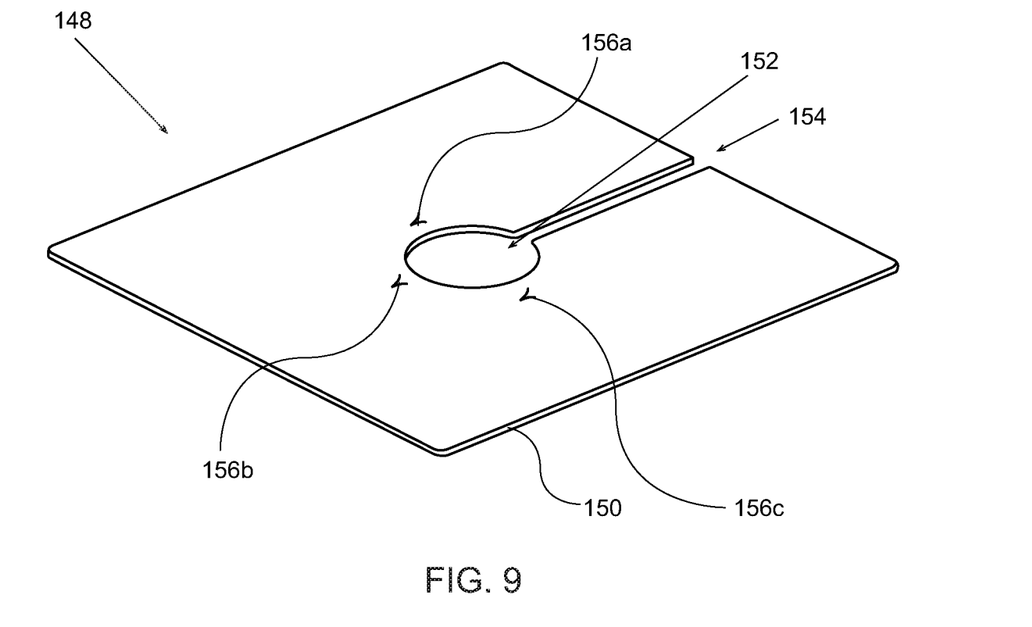
FIG. 9 illustrates a perspective view of an exemplary planar wick member, in accordance with an embodiment of the present invention.

As referenced in FIG. 9, the assembly 100 further comprises a planar wick member 148 that rests beneath the plant support member 132, and above a liquid nutrient solution. The planar wick member 148 is the component that wicks the liquid nutrient solution from below the plant to the plant growth medium and the roots of the plant. The planar wick member 148 is defined by a generally flat shape that wicks up liquid nutrient solution from a liquid source up to the plants using the process of capillary action. The liquid source from which the planar wick member 148 draws the liquid nutrient may include a pot or other liquid storage container known in the art of hydroponics.

The planar wick member 148 is disposed coplanar to the support surface 134 of the plant support member 132. In this manner, the planar wick member 148 transmits the liquid nutrient by capillary action through the bottom wicking hole 136a, 136b, 136c of the plant support member 132. The planar wick member 148 is defined by a wick perimeter 150 and a generally flat shape. The planar wick member 148 is further defined by a wick gap 154 extending from the wick perimeter 150 to a central wick opening 152. The wick gap 154 enables passage of a plant to pass through the central wick opening 152. In another embodiment, the planar wick member is defined by a plurality of second notches 156a, 156b, 156c configured to receive the second end of the plurality of stakes 122a-c.

Figure 10:
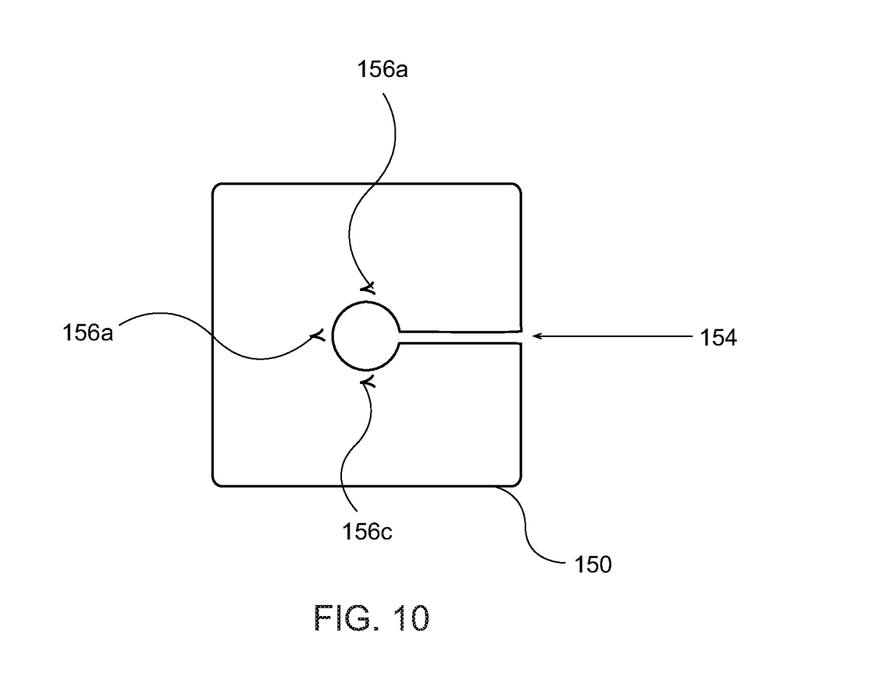
FIG. 10 illustrates a top view of an exemplary planar wick member, in accordance with an embodiment of the present invention.

Looking now at FIG. 10, the planar wick member 148 may have at least one of the following shapes: a circle, a rectangle, and a square. In one embodiment, the planar wick member 148 that may be fabricated from flexible hydrophilic material. Though in other embodiments, the planar wick member 148 may include, without limitation, geotextile cloth, cloth, foam, sponge, non-woven materials, woven materials, open cell materials, closed cell materials, fibrous rope, propylene felt strips, tiki torch wicks, rayon rope, mop head strands, braided polyurethane yarn, wool felt, wool rope, nylon rope, and cotton rope. In some embodiments, the planar wick member 148 may include a plurality of notches configured to receive the stakes 122a-c extending from the bottom of the reservoir 102.

It is significant to note that the assembly 100 may be operational without the planar wick member 148. In this alternative arrangement, only the reservoir 102 and reservoir cap 104 are used to feed the plant. Further, any number of different wicks or plant growing media may be used to supplement or replace the planar wick member 148.

In accordance with the present disclosure, the assembly 100 can be fabricated to scale any size or shape plant growing medium. For example, the assembly 100 can be fabricated to scale plant growing medium having the following dimensions: 4"×4", 6"×6", 8"×8", 9"×12", and 18"×18". The assembly 100 can be scaled larger if similar multiple units are created that would all attach to cover a larger surface area. It should be understood that the amount of volume the reservoir 102 and plant support member 132 can hold will be according to scale such that a plant growing in a 4"×4"×4" Rockwool cube does not require the same amount of liquid nutrition as a plant in a five gallon pot.

In a further embodiment, the assembly 100 is configured to be disposable after one or more uses or reusable after several prior uses. In another embodiment, the assembly 100 may be fabricated of biodegradable materials, such as Biosphere plastic, synthetic biodegradable polymers, and any other suitable sturdy biodegradable material capable of retaining liquids, e.g., water.

FIGS. 11-16 are various views of an alternative embodiment of a top dripping and bottom wicking assembly 200, having a plant support member 232 and planar wick member 248 shaped in a circular configuration. The reservoir 102 and reservoir cap 104 are substantially the same as the assembly 100 described above. The circle configuration of the assembly 200 operates substantially the same as the square configuration of the assembly 100. However, the circular assembly 200 may be more appropriate for differently shaped pots and plants. In other embodiments, other shapes for the assembly may include, without limitation, a rectangle, a pyramid, a rhombus, a sphere, and an irregular shape.

Figure 11:
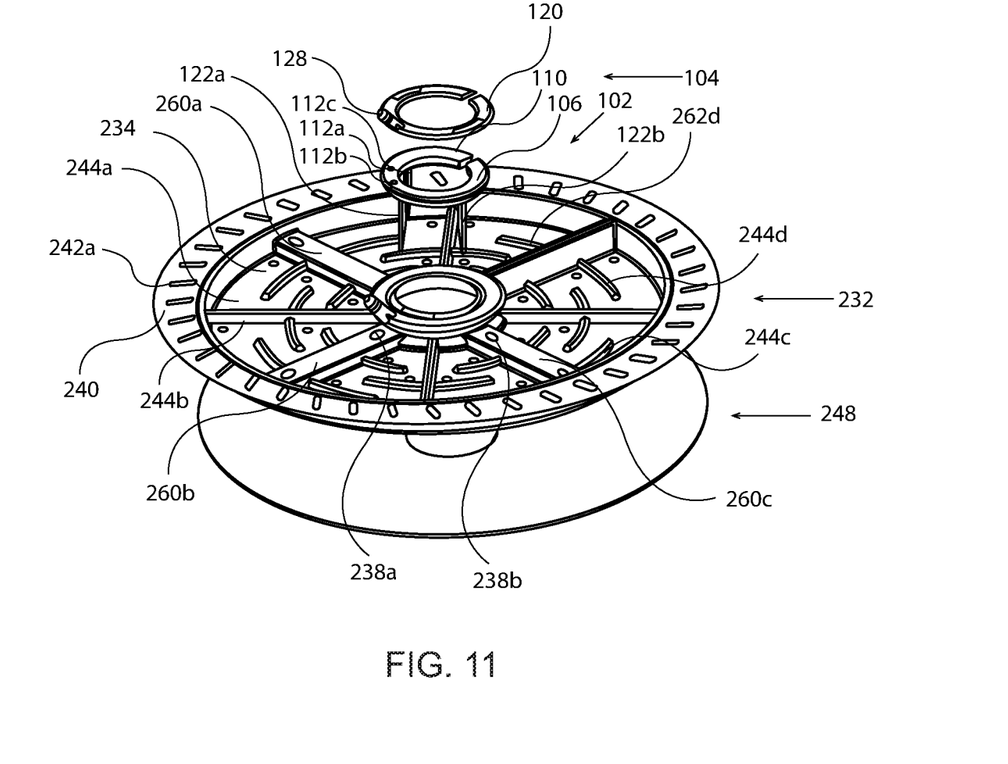
FIG. 11 illustrates a perspective view of an alternative embodiment of a top dripping and bottom wicking assembly, having a plant support member and planar wick member shaped in a circular configuration, in accordance with an embodiment of the present invention.

Looking now at FIG. 11, a circular plant support member 232 that supports the plant and helps distribute the liquid nutrient solution evenly through the plant growth medium. The reservoir 102 positions above the plant support member 232 to drip liquid nutrient solution directly on top of the plant as it is supported on the plant support member 132. A plurality of stakes 122a, 122b, 122c support the reservoir 102 above the plant support member 132.

Figure 12:
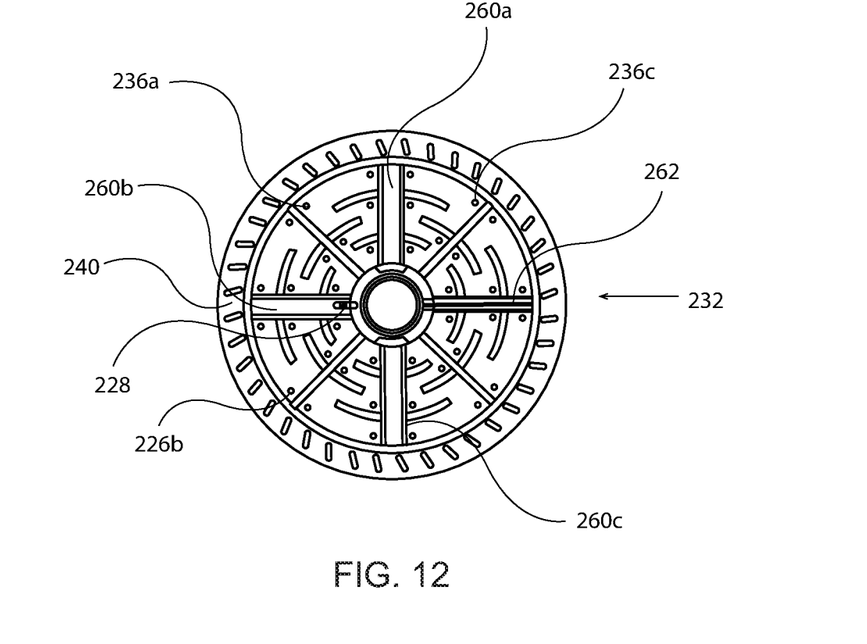
FIG. 12 illustrates a top view of a circular plant support member, in accordance with an embodiment of the present invention.

As shown in FIG. 12, the plant support member 232 is defined by a support surface 234. The support surface 134 forms at least one bottom wicking hole 236a, 236b, 236c for enabling passage of wicked water to the soil medium and roots of the plant. Further, at least one aperture 238a, 238b forms in the support surface 234 to receive the second end 126 of the stakes 122a-c.

Figure 13:
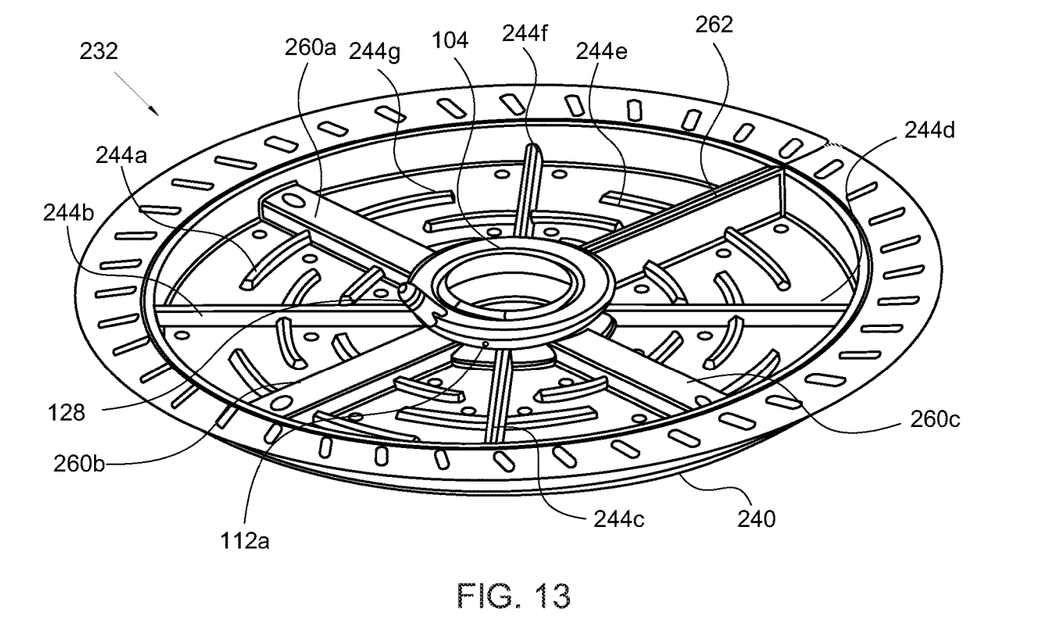
FIG. 13 illustrates a perspective view of a circular plant support member, in accordance with an embodiment of the present invention.

As FIG. 13 shows, the plant support member 232 is also defined by a brim 240 that encircles the support surface 234. In some embodiments, a plurality of brim apertures 242a form in the brim 240 to drain excess liquid nutrient solution. The plant support member 232 is also defined by at least one segregating wall 244a-g that segregates the support surface 234 into sections. This segregation helps in control distribution of the liquid nutrient solution through the drip holes 112a-b of the reservoir 102.

Figure 14:
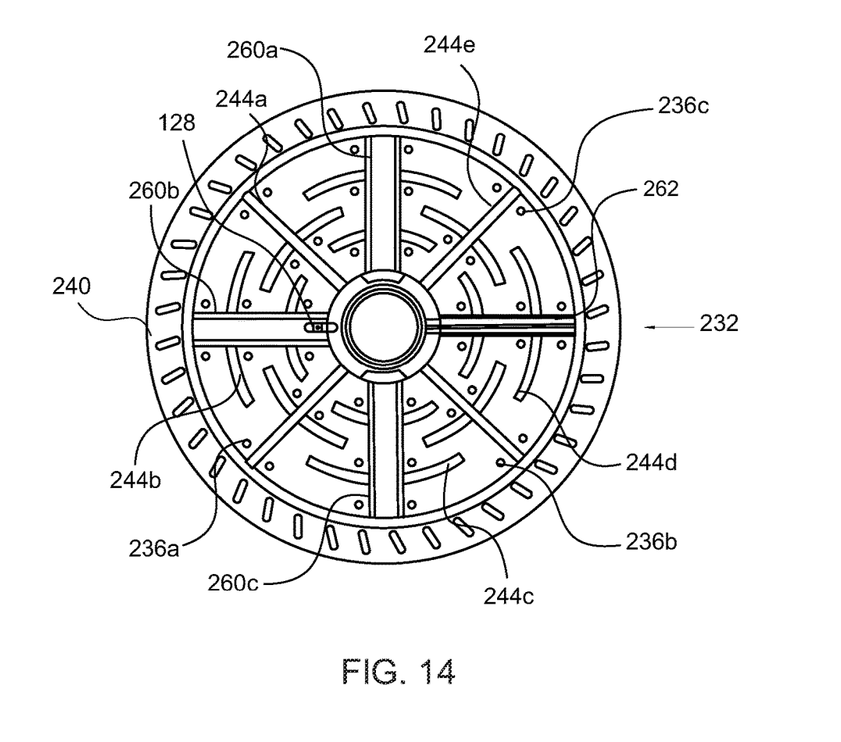
FIG. 14 illustrates a bottom view of a circular plant support member, in accordance with an embodiment of the present invention.

Looking now at FIG. 14, the plant support member 232 is also defined by a support member gap 262 that enables passage of the plant through the brim 240. In some embodiments, a plurality of conduits 260a, 260b, 260c traverse the support surface 234 to carry excess liquid nutrient solution to a brim aperture for discharge. This prevents excess moisture from damaging the plant roots.

Figure 15:
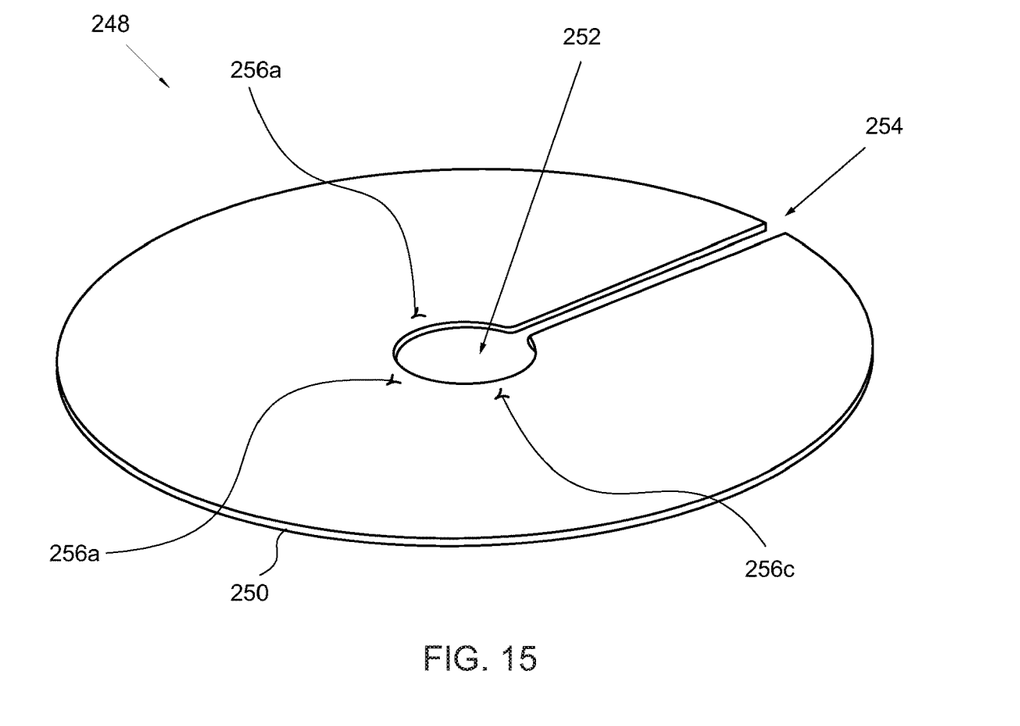
FIG. 15 illustrates a perspective view of a circular planar wick member, in accordance with an embodiment of the present invention.

Looking now at FIG. 15, the assembly 200 further comprises a planar wick member 248 that rests beneath the plant support member 232, and above a liquid nutrient solution. The planar wick member 248 is disposed coplanar to the support surface 234 of the plant support member 232. In this manner, the planar wick member 248 transmits the liquid nutrient by capillary action through the bottom wicking hole 236a-c of the plant support member 232.

Figure 16:
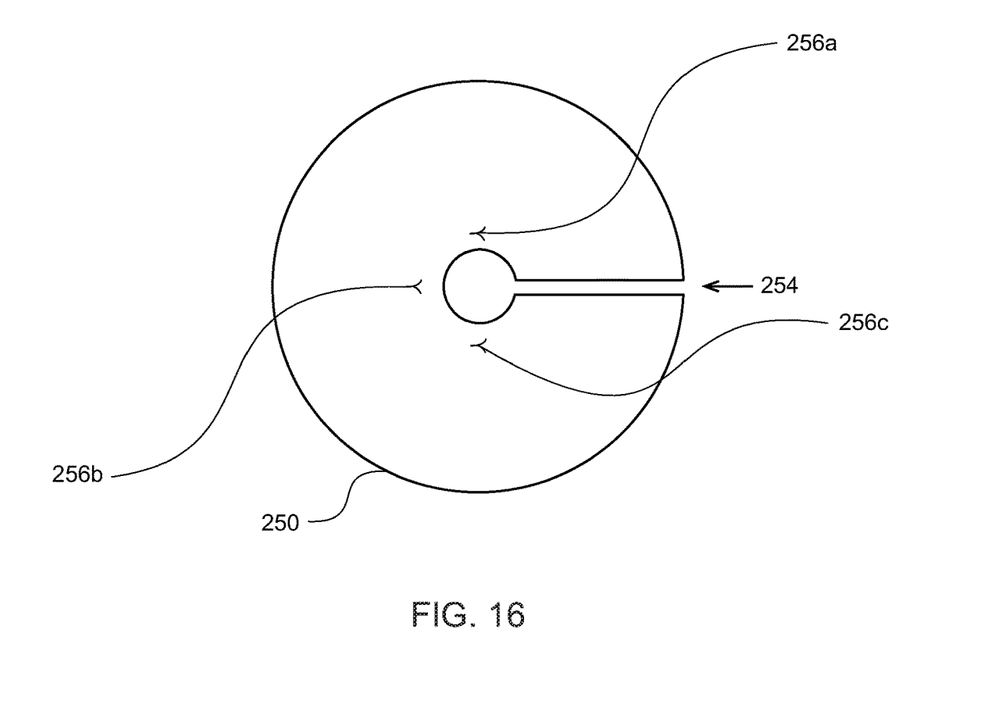
FIG. 16 illustrates a top view of a circular planar wick member, in accordance with an embodiment of the present invention.

Turning now to FIG. 16, the planar wick member 248 is defined by a wick perimeter 250 and a generally flat shape. The planar wick member 248 is further defined by a wick gap 254 extending from the wick perimeter 250 to a central wick opening 252. The wick gap 254 enables passage of a plant to pass through the central wick opening 252. In another embodiment, the planar wick member 248 is defined by a plurality of second notches 256a, 256b, 256c configured to receive the second end of the stakes 122a-c.

Figure 17:
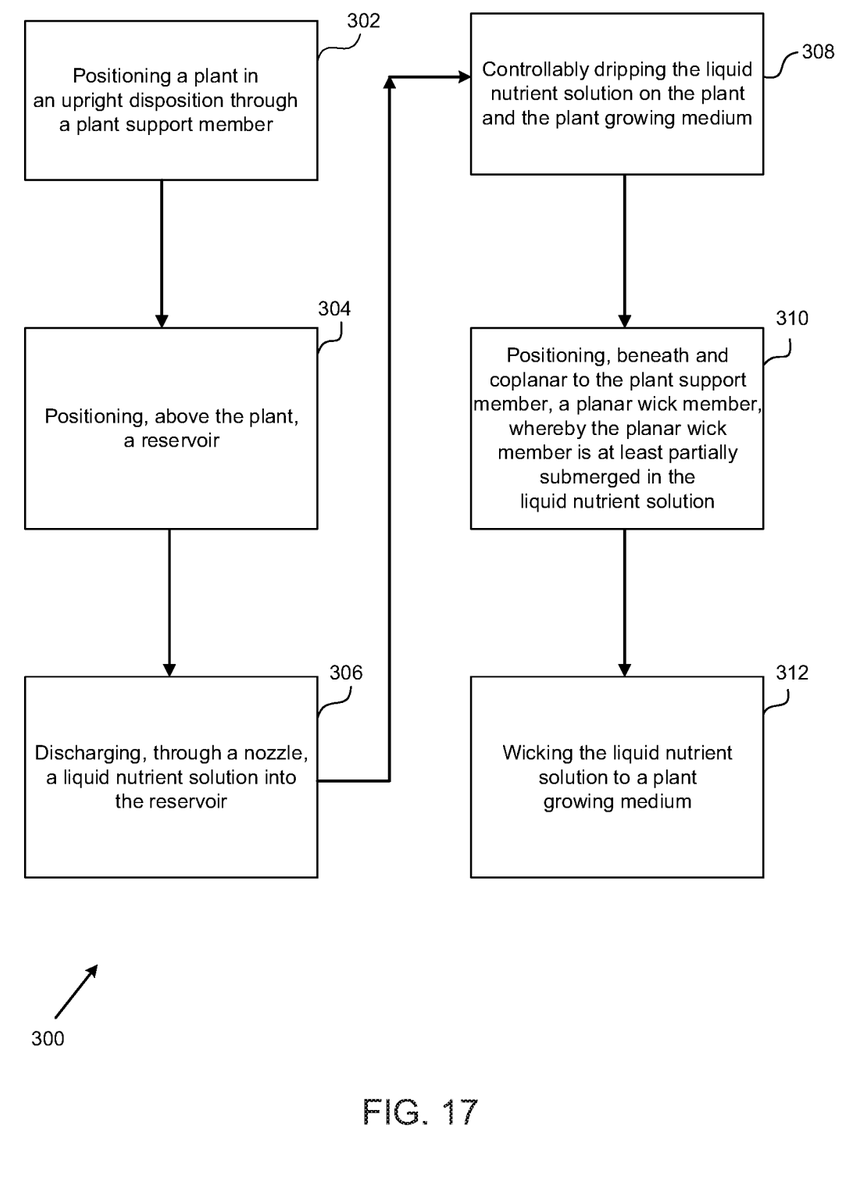
FIG. 17 illustrates a flowchart of an exemplary method for feeding a plant with a top dripping and bottom wicking assembly, in accordance with an embodiment of the present invention.

FIG. 17 illustrates a flowchart of an exemplary method 300 for feeding a plant with a top dripping and bottom wicking assembly. The method 300 comprises an initial Step 302 of positioning a plant in an upright disposition through a plant support member. A Step 304 may include positioning, above the plant, a reservoir. Another Step 306 includes discharging, through a nozzle, a liquid nutrient solution into the reservoir.

In some embodiments, a Step 308 comprises controllably dripping the liquid nutrient solution on the plant and the plant growing medium. In yet another embodiment, a Step 310 includes positioning, beneath and coplanar to the plant support member, a planar wick member, whereby the planar wick member is at least partially submerged in the liquid nutrient solution. A final Step 312 comprises wicking the liquid nutrient solution to a plant growing medium.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A top dripping and bottom wicking assembly, the assembly comprising:
   a reservoir defined by a generally ring-shape, the reservoir further being defined by a reservoir inner wall and a reservoir outer wall that form a channel, the walls being defined by at least one drip hole;
   a reservoir cap adapted to mate with the reservoir, the reservoir cap defined by a generally ring-shape, the reservoir cap further being defined by a cap inner wall and a cap outer wall,
   whereby the cap inner wall detachably couple to the reservoir outer wall; a nozzle integrated with the reservoir cap, the nozzle being in communication with the channel of the reservoir;
   a plant support member defined by a support surface, the support surface forming at least one bottom wicking hole, the plant support member further being defined by a brim that encircles the support surface, the brim forming a plurality of brim apertures, the plant support member further being defined by at least one segregating wall that segregates the support surface, the plant support member further being defined by a central support member opening;

a plurality of conduits disposed on the support surface of the plant support member, the plurality of conduits in communication with the central support member opening and the plurality of brim apertures;

a plurality of stakes extending between the reservoir and the plant support member, the plurality of stakes defined by a first end and a second end; and a planar wick member fabricated of flexible hydrophilic material for transmitting liquid by capillary action through the bottom wicking hole of the plant support member, the planar wick member disposed coplanar to the support surface of the plant support member, the planar wick member defined by a wick perimeter and generally flat shape, the planar wick member further defined by a wick gap extending from the wick perimeter to a central wick opening.

2. The assembly of claim 1, wherein the reservoir and the reservoir cap are defined by at least one of the following shapes: a ring, circle, a rectangle, and a square.

3. The assembly of claim 1, wherein the reservoir and the reservoir cap are fabricated from at least one of the following: plastic, rubber, metals, alloys, and combinations thereof.

4. The assembly of claim 1, wherein the reservoir and the reservoir cap are molded from a single sheet of biodegradable material.

5. The assembly of claim 1, wherein the reservoir is defined by a reservoir gap.

6. The assembly of claim 1, wherein the plant support member and the planar wick member are defined by at least one of the following shapes: a ring, a circle, a rectangle, and a square.

7. The assembly of claim 1, wherein the reservoir and the reservoir cap couple together in at, least one of the following: a snap-fit relationship, ultrasonic welding, and a bonding agent.

8. The assembly of claim 1, wherein the nozzle comprises a plurality of barbs.

9. The assembly of claim 1, wherein the reservoir outer wall is defined by a plurality of L-shaped first notches receiving the first end of the plurality of stakes.

10. The assembly of claim 1, wherein the reservoir inner wall is defined by raised ridges.

11. The assembly of claim 1, wherein the planar wick member is fabricated from at least one of the following: geotextile cloth, cloth, foam, sponge, non-woven materials, woven materials, open cell materials, closed cell materials, fibrous rope, propylene felt strips, tiki torch wicks, rayon rope, mop head strands, braided polyurethane yarn, wool felt, wool rope, nylon rope, and cotton rope.

12. The assembly of claim 1, wherein the at least one segregating wall comprises eight segregating walls.

13. The assembly of claim 1, wherein the support surface of the plant support member is disposed at a grade of at least 0.5 percent from the central support member opening to the brim of the plant support member.

14. The assembly of claim 1, wherein the plant support member is defined by a support member gap.

15. The assembly of claim 1, wherein the plant support member is fabricated from an opaque material.

16. The assembly of claim 1, wherein the plant support member is fabricate by injecting molding.

17. The assembly of claim 1, wherein the plant support member is fabricated of a poly-vinyl material or a vacuum formed or thermoformed plastic material.

18. The assembly of claim 1, wherein the planar wick member is defined by a plurality of second notches configured to receive the second end of the plurality of stakes.

19. A top dripping and bottom wicking assembly, the assembly consisting of:

a reservoir defined by a generally ring-shape, the reservoir further being defined by a reservoir inner wall and a reservoir outer wall that form a channel, the reservoir outer wall being defined by a plurality of L-shaped first notches, the reservoir inner and outer walls being defined by at least one drip hole, the reservoir inner wall being defined by raised ridges;

a reservoir cap adapted to mate with the reservoir, the reservoir cap defined by a generally ring-shape, the reservoir cap further being defined by a cap inner wall and a cap outer wall, whereby the cap inner wall detachably couple to the reservoir outer wall, whereby the reservoir and the reservoir cap are defined by at least one of the following shapes: a ring, a circle, a rectangle, and a square;

a nozzle integrated with the reservoir cap, the nozzle being in communication with the channel of the reservoir;

a plurality of barbs disposed in the nozzle;

a plant support member defined by a support surface, the support surface forming at least one bottom wicking hole, the plant support member further being defined by a brim that encircles the support surface, the brim defined by a plurality of brim aperture, the plant support member further being defined by at least one segregating wall that segregates the support surface, the plant support member further being defined by a central support member opening, the support surface being disposed at a grade of at least 0.5 percent from the central support member opening to the brim;

a plurality of conduits disposed on the support surface of the plant support member, the plurality of conduits in communication with the central support member opening and the plurality of brim apertures;

a plurality of stakes extending between the reservoir and the plant support member, the plurality of stakes defined by a first end and a second end; and a planar wick member fabricated of flexible hydrophilic material for transmitting liquid by capillary action through the bottom wicking hole of the plant support member, the planar wick member disposed coplanar to the support surface of the plant support member, the planar wick member defined by a wick perimeter and a generally flat shape, the planar wick member further defined by a wick gap extending from the wick perimeter to a central wick opening.

* * * * *